United States Patent [19]

Webb

[11] Patent Number: 4,932,257
[45] Date of Patent: Jun. 12, 1990

[54] DOUBLE WALL PIPING SYSTEM

[76] Inventor: Michael C. Webb, 15 E. Uwchlan Ave., Exton, Pa. 19341

[21] Appl. No.: 103,469

[22] Filed: Oct. 1, 1987

[51] Int. Cl.$^5$ .............................................. G01M 3/00
[52] U.S. Cl. ................... 73/40.5 R; 73/49.1; 285/21
[58] Field of Search ............ 73/49.1, 49.5, 49.8, 73/40.5 R, 49.2; 138/90, 104, 114, 109, 115; 285/93, 21, 238, 239, 13; 137/312

[56] References Cited

U.S. PATENT DOCUMENTS

| 347,084 | 8/1886 | Blackmore et al. | 285/13 |
|---|---|---|---|
| 3,245,701 | 4/1966 | Leopold, Jr. et al. | 285/239 |
| 3,459,229 | 8/1965 | Croft | 73/49.1 |
| 3,531,265 | 9/1970 | Griepel | 73/40.5 R |
| 3,721,270 | 3/1973 | Wittgenstein | 138/104 |
| 3,802,456 | 4/1974 | Wittgenstein | 138/104 |
| 3,982,776 | 9/1976 | Payne | 285/39 |
| 4,062,376 | 12/1977 | McGrath | 73/49.1 |
| 4,157,194 | 6/1979 | Takahashi | 138/114 |
| 4,232,736 | 11/1980 | Pillette | 285/93 |
| 4,436,987 | 3/1984 | Thalmann et al. | 285/21 |
| 4,568,925 | 2/1986 | Butts | 73/49.2 |
| 4,618,168 | 10/1986 | Thalmann et al. | 285/21 |
| 4,629,216 | 12/1986 | Pedersen | 285/21 |
| 4,667,505 | 5/1987 | Sharp | 73/49.1 |

FOREIGN PATENT DOCUMENTS 245418 4/1969 U.S.S.R. .................................. 73/49.1
875224 8/1961 United Kingdom .

Primary Examiner—Hezron E. Williams

[57] ABSTRACT

A double wall pipeline is provided for a pumping system for fluid products, such as gasoline, diesel fuel and chemicals, and including a pump for pumping such products from a storage tank through the pipeline to a product dispenser. The double wall pipeline comprises a double wall, an inner primary pipe, an outer secondary pipe spaced from and surrounding the primary pipe, and integral spokes or spacers for supporting the secondary pipe in spaced relation to the primary pipe so as to create an annular space therebetween. The ends of some of the secondary pipe sections are stripped or cut back so as to terminate short of the corresponding end of the primary pipe and thereby permit testing and inspection of the primary pipe prior to completion of a secondary piping system in which the secondary pipe is incorporated. Unique primary and secondary fittings are provided as well as an air test clamp assembly for testing the integrity of the primary pipe and a collection sump fitting incorprated in the pipeline to permit the location of a leak to be visually determined.

10 Claims, 4 Drawing Sheets

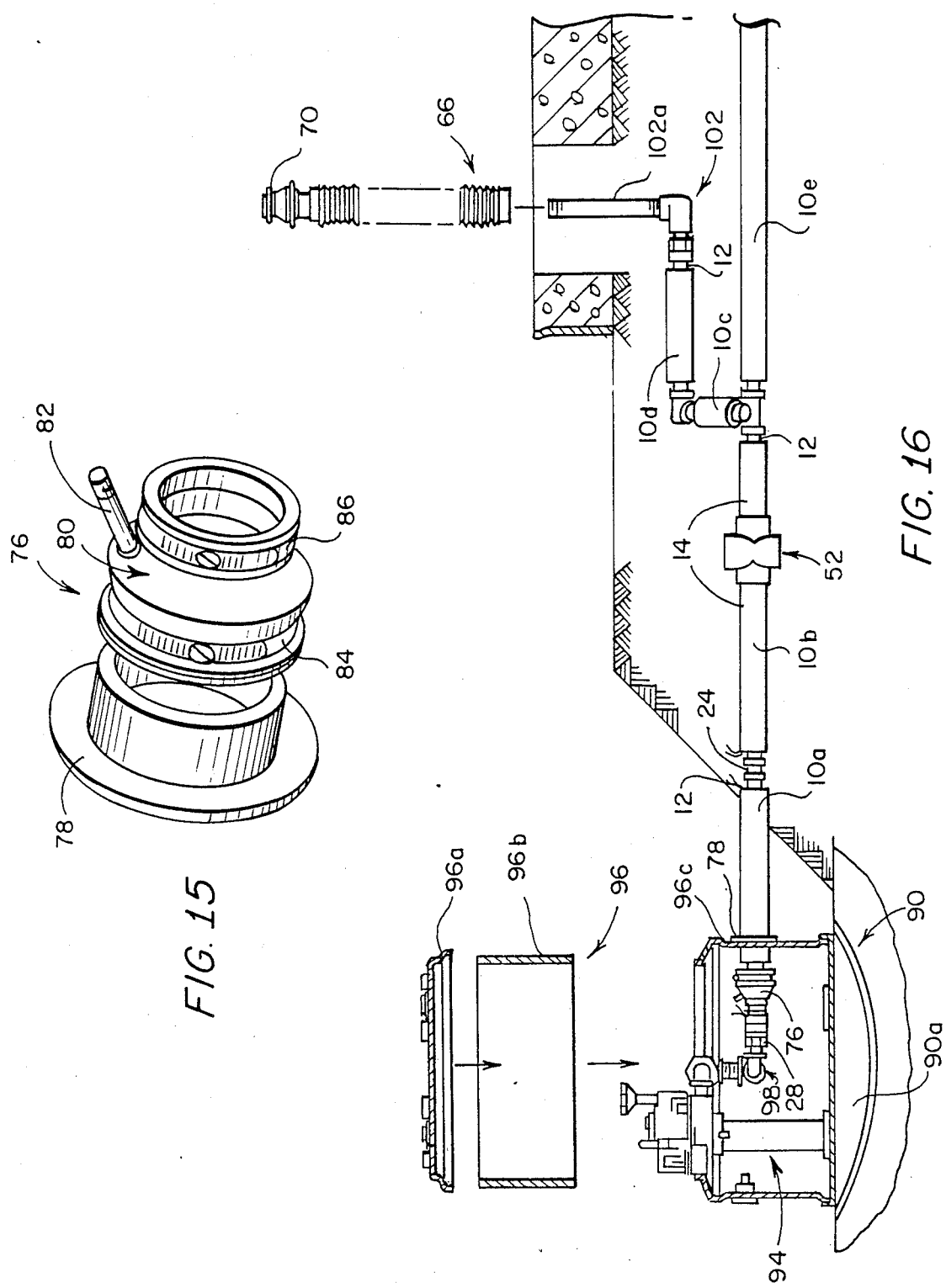

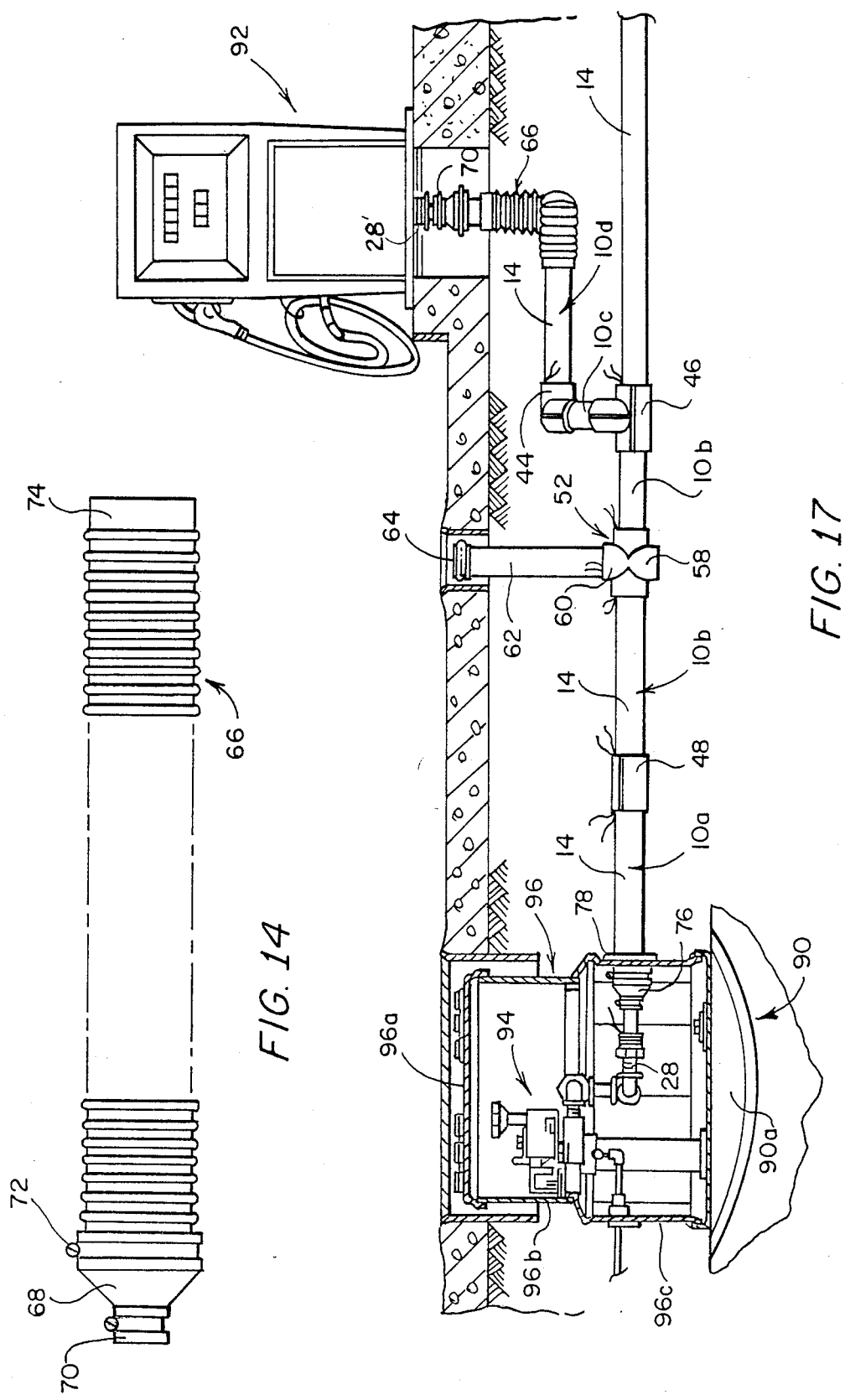

4,932,257

DOUBLE WALL PIPING SYSTEM

FIELD OF THE INVENTION

The present invention relates to a double wall piping system particularly adapted for use in subterranean applications involving dispensing of hazardous liquids such as gasoline, diesel fuel and chemicals.

BACKGROUND OF THE INVENTION

Subterranean piping systems such as gasoline and diesel fuel pipelines are typically found at service stations are installed and connected to fuel dispensing pumps so as to provide dispensing of fuels from a fuel storage tank or tanks, usually installed below ground, to fuel dispensers, which are located above ground.

Conventionally, such undergound piping systems comprise single wall pipes which are connected together on the site using standard straight pipes and associated fittings such as tees, 90° elbows, 45° elbows, and unions.

The underground storage tanks, the associated piping systems, and the fuel dispensers have all been determined to be sources of environmental pollution, as well as safety hazards because of leakage into the surrounding earth. Fire, explosions, and pollution of ground water have occurred because of these leakages.

With respect to the problem of leakage from underground fuel storage tanks, one solution has been to use double wall tanks, rather than conventional single wall tanks. Double wall steel tanks and double wall fiberglass tanks which are used to remedy this problem (together with a secondary containment and corrosion protection for the tanks) are disclosed in U.S. Pat. Nos. 4,568,925 (Butts) and 4,672,366 (Butts). The secondary containment system disclosed in these patents is applied to a conventional steel tank and creates a unique double wall tank referred to as a "jacketed steel tank". In the event of a leak in the inner primary tank, the leak is contained in the outer secondary tank. Most such double wall tanks are equipped with a leak detection device for signalling an alarm, in the event that a leak should occur.

While such tanks provide a partial solution, it has been determined that a substantial percentage of leakage which occurs at a typical service station site is due to leakage from the underground piping system. Various attempts have been made to deal with this problem. One approach is to install the piping in a trench line with a fuel impervious membrane liner or semi-rigid trough. This technique, if carefully installed, can provide a measure of containment of leakage from the piping system. However, such an approach does not offer truly effective leak detection. In particular, this technique does not permit a determination of when the leak occurred, or of the pipeline in which the leak is located, or of where in a specific pipeline the leak occurred. With such a system, should a leak occur, it may be required that all of the backfill contained within the trench or liner be removed. Further, integrity testing of such a system, by means of air pressure testing, is not possible. Further, in general, such systems do not provide 360° containment and thus fill with water, thereby eventually becoming ineffective.

A further solution to the problem of leakage from piping systems involves the use of fiberglass primary piping from the pump of the underground storage tank to the above ground fuel dispenser, this piping being encapsulated with an outer secondary fiberglass pipe and with fittings that are installed simultaneously with the primary pipe. The secondary pipe is, of necessity, of a larger diameter than the primary pipe so as to enable the secondary pipe to slide over the smaller primary pipe. The secondary fittings are of a clam shell design adapted to fit over primary fittings after the primary pipe has been bonded together, integrity tested and inspected. Secondary fittings are bonded to the secondary pipe by a combination of nuts and bolts, and through the use of fiberglass resins or a fuel resistant sealant. Such a solution does not permit a complete inspection of the entire primary piping system during an air pressure integrity test. Due to the construction and design of this system, the limited components available, and the bonding techniques used, it is difficult to install a system of this type which is air pressure testable. Further, the components of this system are expensive to make as well as expensive to install.

General considerations, and both present and future regulatory requirements for primary piping, dictate that the piping possess a number of basic characteristics and meet a number of general design criteria. In this regard, the secondary containment system should be of such a design that the secondary system contains the primary system from the dispenser to the tank including the submersible pump housing and all swing joints. In addition, the secondary containment system should allow for complete inspection of the primary pipe fittings during an air pressure soap test, before the secondary pipe system is completed. Further, the secondary containment system should be compatible with the products to be stored. In addition, the secondary containment system should be non-corrosive, dielectric and non-degradable, and should be resistant to attack from microbial growth. Still further, the secondary containment system, the materials used therein and the design thereof, should be of sufficient strength to withstand the maximum underground burial loads. In addition, the secondary containment fitting should be capable of being installed over the primary fittings after completion, testing and inspection of the primary piping system is complete so as to allow inspection of the primary fittings during such testing. Further, the secondary containment system should have a monitored fuel collection sump at the low end of the system which provides a fitting for insertion of a continuous monitoring sensor for signaling an alarm should a leak occur in the primary piping.

SUMMARY OF THE INVENTION

Broadly speaking, the present invention concerns a double wall piping system which incorporates both the primary and secondary containment piping and which exhibits the characteristics set forth above. The primary pipe and secondary pipe are spaced by means of spacers or spokes so as to create an annular space between the two pipes and the entire double wall pipe including the primary and secondary pipes is fabricated of plastic and extruded as a single integral unit. The double wall piping system of the invention permits inspection of the primary fittings before the secondary fittings are put in place and, once installed, the piping system of the present invention performs as an air-tight guttering system, providing containment of the primary pipe from a location under the product dispensers to the pump of the tank, including all swing joints and/or flex connectors.

Any leak in the primary pipe will flow from the high end of the system, i.e., under the fuel dispenser, to a collection sump which houses the pump for the tank and the associated fittings at the low end of the system. Leak detection can be accomplished at the collection sump by visual or electronic monitoring.

In installing the piping system of the present invention, the secondary pipe and associated spoke members are cut back a predetermined distance (typically 2 to 2½ inches) from the end of the primary pipe so as to permit testing and inspection of the primary pipe prior to the completion of the secondary piping system in which the secondary pipe is incorporated.

In accordance with a further important feature of the invention, the pipe fittings for the primary pipe are provided in the form of "tees", 45° elbows, 90° elbows, straight connectors and the like, which include a built-in fusion welding wire for bonding the corresponding fitting to the primary pipe. This approach provides excellent sealing between the primary pipe and the corresponding fitting, in a very expeditious manner.

According to yet another important feature of the present invention, an air test clamp is provided for the double wall piping system which enables air pressure testing of the secondary piping system. The air test clamp assembly is disposed at a location at which the primary pipe extends beyond the secondary pipe and the test clamp assembly preferably comprises a fitting member, clamping means for releasably clamping one end of the fitting member to the exterior of the primary pipe and for clamping the other end of the fitting member externally of the secondary pipe, and valve means for permitting connection of the fitting member to a source of air under pressure so that such pressurized air can be supplied to the secondary piping system. This permits a soap test such as referred to above to be carried out in order to detect pin hole leaks in the seals between the secondary pipe and the associated fittings therefore.

Advantageously, the air test clamp assembly is affixed to a wall of a unit of the pumping system such as the collection sump in which the pump is located. This wall is provided with a hole therein through which a portion of the pipeline system extends and the test clamp assembly preferably comprises a coupling member including a flange attached (e.g. welded) to the wall and a base portion extending through the wall. The clamping means referred to above preferably comprises a first clamp for clamping the one end of the fitting member to the exterior of the primary pipe and a second clamp for clamping the other end of the fitting member to the exterior of the base portion of the coupling member. The fitting member is preferably fabricated of resilient material such as neoprene rubber and comprises first and second spaced end portions of different diameters and an intermediate portion in which the valve means is disposed.

A further important feature of the present invention concerns the provision of leakage monitoring means for the double wall pipeline system which provides an indication of a leak in the primary line and serves in determining where in the line the leak has occurred. The leakage monitoring system preferably comprises a sump fitting having first and second spaced, aligned end portions through which a portion of the double wall pipeline system extends. This pipeline portion includes a hole in the secondary pipe and the sump fitting is welded to the pipeline portion so as to surround the hole. The sump fitting further comprises a sump portion in which leaking fluids can collect. Advantageously, the sump fitting is cross shaped and includes an upwardly extending observation portion, in alignment with the sump portion and the hole in the secondary pipe, for permitting observation of any fluid collected in the sump portion.

Pumping systems of the type under consideration characteristically include at least one flexing connection such as a swing joint or a flex connector and, in accordance with a further important aspect of the present invention, the pipeline system includes a corrugated flexible pipe in which the flexing connection is contained, and clamping means for clamping the flexible pipe in place.

Another important feature of the invention concerns the provision of secondary fittings for connecting adjacent portions of the secondary pipe of the pipe line system. These fittings can comprises tees, 45° elbows, 90° elbows, straight connectors and the like and basically comprises a split fitting member having a split therein in the top surface thereof. Advantageously, the split takes the form of a V-shaped groove and the opposed ends of the fitting which define the groove are joined together by fusion rod welding wherein triangular fusion welding rods received in the V-shaped groove.

Pumping systems of the type under consideration typically include a metal (steel) primary line and in accordance with a further important feature of the invention, a connector member is provided for connecting the primary pipe to the steel primary line. The connector member preferably comprises a metal member having a connection end, advantageously in the form of a hex-headed nut, adapted to be connected to the steel primary line and a base portion which is serrated or barbed in cross section, and an injection molded, high density plastic end section which encapsulates the barbed base portion of the metal member.

As will become apparent, the piping system of the present invention provides many benefits and advantages as compared with prior art systems More specifically, one major advantage is that the cost of the system is competitive with respect to both component costs and installation costs, while the system of the invention is much faster and easier to install than other primary or secondary containment systems of the type under consideration. In addition, as noted above, the system is able to be air pressure tested to insure containment integrity of both the primary and secondary pipes. Further, the system permits identification of which primary pipe is leaking and the approximate location of the leak. Still further, the system can be flushed out after a leak has occurred and repairs have been completed. Still further, the double wall piping system of the invention does not interfere with the assembly, testing and inspection of the primary pipe fittings Further, the fusion welding process used in bonding the components of the system together is highly advantageous, as was mentioned above and is discussed further below. Further, the system incorporates, or can incorporate, a large number of different components which can accommodate almost any pattern or layout of piping desired. Further, the system can be installed on both new installations as well as retrofit installations.

Other features and advantages of the present invention will be set forth in, or apparent from, the detailed description of preferred embodiments of the invention which follows.

BRIEF DESCRIPTION OF THE DRAWINGS

FIG. 14 is a side elevational view of a corrugated flexible pipe constructed in accordance with a further aspect of the present invention;

FIG. 15 is a perspective view of a test clamp assembly constructed in accordance with a further aspect of the present invention;

FIG. 16 is a schematic cross sectional view of a pumping system incorporating the invention, illustrating the assembly of the primary piping system; and FIG. 17 is a view similar to that of FIG. 16 illustrating the assembly of the secondary piping system.

DESCRIPTION OF THE PREFERRED EMBODIMENTS

Figure 1:
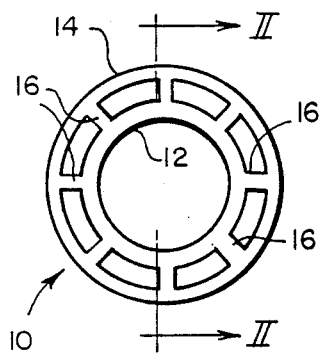
FIG. 1 is a cross sectional view of the double wall pipe which is a key component of the piping system of the present invention.

Before examining the overall pumping system of the invention, important individual components making up the system will be considered so that the function of these components in the overall system can be better understood. Thus, referring to FIGS. 1 and 2, a key component of the piping system of the present invention is, as discussed above, the double wall piping utilized therein, a section of this piping being indicated at 10. The double wall piping 10 includes an inner primary pipe 12, an outer secondary pipe 14 and a plurality of intermediate spacer members or spokes 16, (best seen at FIG. 1) which support pipes 12 and 14 in spaced relationship so as to create an annular space therebetween. The double wall pipe 10 is preferably plastic extruded out of high density polyethylene, with the primary pipe 12, secondary pipe 14 and spokes 16 all being extruded in the same operation at the same time so as to create a one piece double wall pipe. The inner primary pipe 12 is, in a preferred embodiment, thicker than spokes 16. As will be discussed in more detail below, in order to make connection to corresponding primary fittings (which are described below in connection with FIGS. 3 to 7), the secondary pipe 14 and associated spokes 16 are stripped or cut back approximately two inches to permit assembly, sealing, inspection and observation of the primary fitting.

Figure 3:
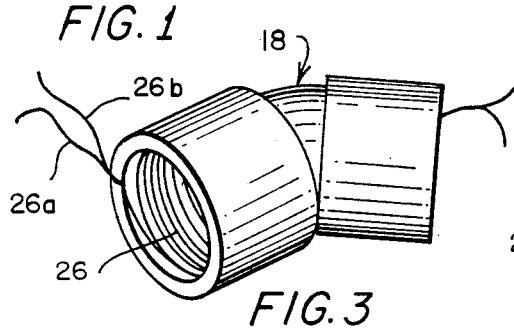
FIGS. 3, 4, 5, and 6 are perspective views of, respectively, a primary 45° elbow fitting, a primary 90° elbow fitting, a primary "tee" fitting, and a primary straight connector fitting.
Figure 4:
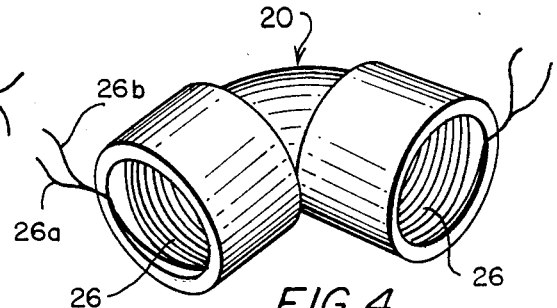
Figure 5:
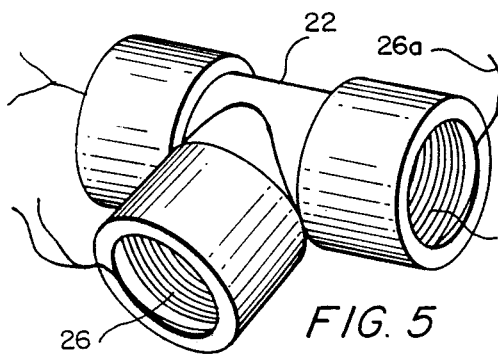
Figure 6:
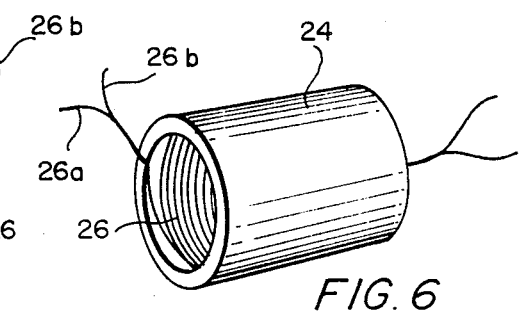

Typical primary fittings are shown in FIGS. 3 to 6. In particular, FIG. 3 shows primary 45° elbow denoted 18, FIG. 4 shows a primary 90° elbow denoted 20, FIG. 5 shows a primary "tee" denoted 22 and FIG. 6 shows a primary straight connector denoted 24. Each of the primary fittings of FIG. 3 to 6 is prefereably injection molded of high density polyethylene. A key feature of these fittings is that a fusion wire, denoted 26 in each figure, is molded during the injection molding process into the corresponding fitting itself. More specifically, a fusion were 26 is molded into the fitting at each opening thereof (so that three such fusion wires, one of which is not shown, are used in tee 22), and, at each of these openings, two lead wires 26a, 26b, connected to a corresponding fusion wire 26, extend or protrude outside that opening. The distance that these lead wires protrude is approximately four inches in an exemplary embodiment. Each fitting includes an internal built-in stop (not shown) so that the pipe can be precisely positioned inside the fitting. The inside diameter of each fitting, including the fusion wire 26, is designed to be slightly larger than the outside diameter of the primary pipe 12 so that the primary pipe 12 can slide smoothly into the fitting. Once an end of the primary pipe 12 has been slid into place within the fitting, the outside of the fitting is clamped with a steel clamp (not shown) so as to provide the necessary pressure to achieve fusion bonding of the primary pipe 12 to the corresponding primary fitting. This bonding process is described in more detail below.

Figure 7:
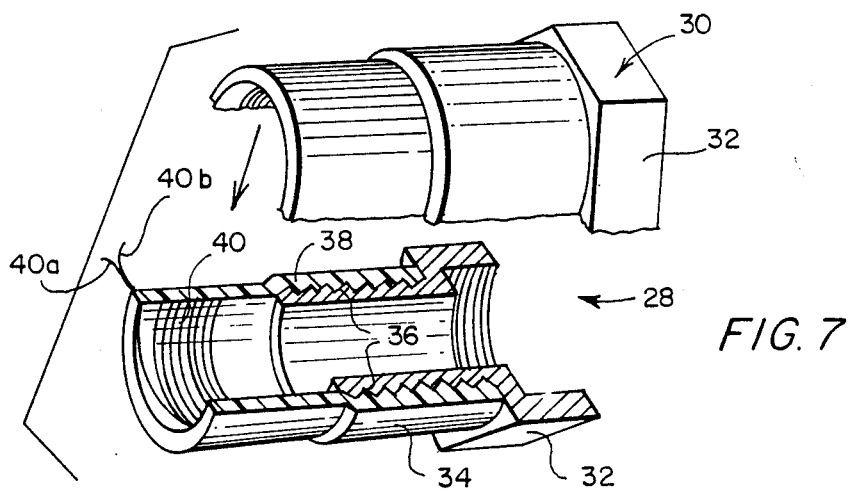
FIG. 7 is an exploded view of a plastic pipe-to-metal-pipe connector fitting.

A further primary fitting 28 is shown in FIG. 7 which is used in connecting or joining the polyethylene primary pipe 12 to a length of steel primary pipe (not shown in FIG. 7) such as the swing joint described below in connection with FIGS. 16 and 17. Connector fitting 28 is designed to connect to a nipple extending from a steel swing joint, or to directly connect to the end of a flexible steel connector, in order to provide a transition in the piping system from high density polyethylene to steel. Connector 28 includes (i) a steel connector portion 30 comprising a hex-headed end portion 32 which connects to the steel pipe referred to above and a base portion 34 of reduced diameter have a serrated or barbed outer surface 36, as illustrated, and (ii) a plastic (polyethylene) portion 38 incorporating a fusion wire 40 and associated leads 40a, 40b, as described above. Connector 28 is injection molded so the polyethylene which forms portion 38 encapsulates the barbed base portion 34 of steel connector portion 30. After the injection molding process, at least one steel clamp (not shown) is clamped in place over the outside of the polythylene in the region of barbed base section 34 to ensure that the connection is air tight. The hex nut end portion 32 of connector 28 is used to tighten the connection to a corresponding steel pipe.

Figure 8:
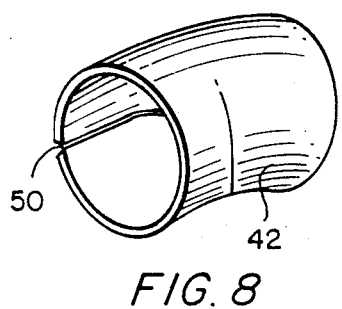
FIG. 8, FIG. 9, FIG. 10, and FIG. 11 are perspective views of, respectively, a secondary 45° elbow fitting, a secondary 90° elbow, a secondary "tee" fitting, and a secondary straight connector fitting.
Figure 9:
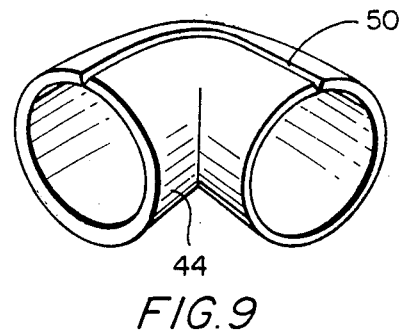
Figure 10:
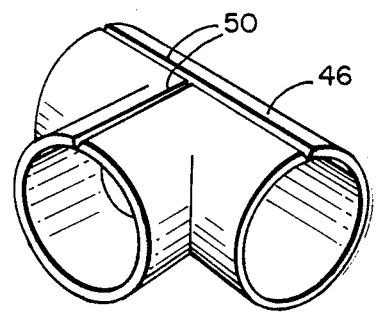
Figure 11:
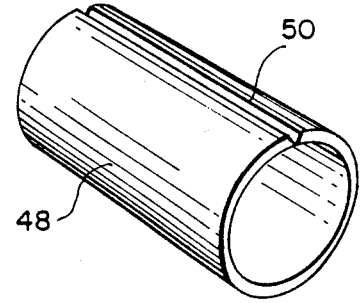

Referring to FIGS. 8 to 11, a series of secondary fittings are shown which are used with the secondary pipe 14 of the double wall piping system 10. In particular, FIG. 8 shows a 45° elbow 42, FIG. 9 a 90° elbow 44, FIG. 10 a "tee" 46 and FIG. 11 a straight connector 48. The fittings of FIGS. 8 to 11 are each split at the top so as to allow them to be spread apart to fit over a corresponding, previously installed primary fitting and in particular, are provided with a V-shaped groove 50 which forms the split. These fittings are preferably made of high density polyethylene so that they are strong but flexible enough to accomodate the spreading apart required in installation.

The fittings of FIGS. 8 to 11 are preferably manufactured using plastic injection molding techniques. The split fitting design permits easy installation, testing and inspection of the corresponding primary fittings before the secondary containment system is installed.

The split fittings of FIGS. 8 to 11 are bonded and sealed to the adjacent portions of the outer secondary containment pipe 14 of the double wall piping 10 by fusion wire welding, between an overlap joint. After the split fittings have been fusion wire welded to the secondary pipe 14, the V-groove split 50 in the top of the fitting is fusion rod welded to complete the seal of the fitting. In general, this is accomplished by laying a bead of triangular shaped welding rod down the groove 50, starting just over the edge. The welding rod is applied through the welding tip of a hot air gun to provide welding of the groove 50. The welding process is described in somewhat more detail below.

Figure 12:
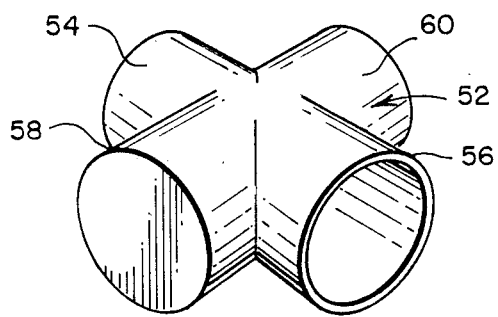
FIG. 12 is a perspective view of a collection sump fitting used in indicating leaks in the system.

Referring to FIG. 12, a secondary sump fitting 52 is shown which is, in use, disposed directly under an observation well in order to determine the approximate leak location should a leak occur in the primary system. Fitting 52 is not split and thus must be installed into the double wall piping system during assembly of the primary pipe system. Fitting 52 is generally cross shaped and includes aligned, open ended arms 54 and 56, a closed arm portion 58 which is directed downwardly and forms a sump, and an oppositely directed open arm portion 60 which, in use, points upwardly towards a corresponding monitoring access hole which, together with fitting 52 and an associated riser (not shown in FIG. 12) complete the observation well. Preferably, fitting 52 is plastic injection molded of high density polyethylene.

Figure 13:
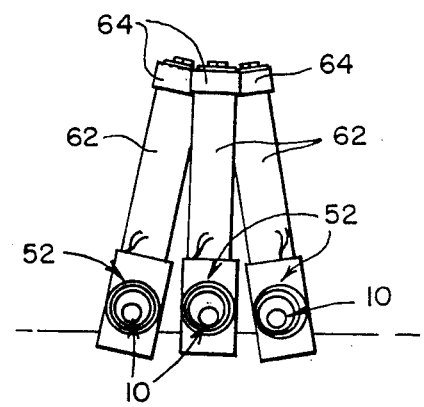
FIG. 13 is a end view of plurality of pipes incorporating collection sump fittings as shown in FIG. 12 and forming a plurality of observation wells.

The installation procedure for sump fitting 52 includes first installing the fitting over the secondary pipe 14 of the double wall pipe 10. At this time, the fitting 52 can be shifted back and forth along the pipe 14. At a predetermined location along the pipe 14 a hole (not shown) is cut therein, which, in the exemplary embodiment under consideration, is approximately 3 inches in diameter. The sump fitting 52 is then moved to a position over this hole and sealed permanently in place using fusion wire welding as described above. As stated, sump portion 58 points downwardly and the open end 60 points upwardly towards a future monitoring access hole (as described in more detail in connection with FIGS. 16 and 17). As is shown in FIG. 13, which is an end view of three fittings 52, in a situation where there are three closely spaced pipes 10, the open end 60 of fitting 52 is then fitted with a riser pipe 62 that is sealed at the top with a cap 64, preferably fabricated of neoprene, so as to form an observation well. As illustrated in FIG. 13, when more than one observation well is located in a single area, it is advantageous to tip the outside wells toward the center so that the riser pipes 62 converge at the top, and thus fit within a small radius, so as to be accommodated underneath an observation manhole.

When such an observation manhole is used, should a leak occur in the primary piping system 12 and thus be identified by fluid collecting in the sump portion 58 of fitting 52, a visual inspection of the observation well for that particular pipe will determine whether or not the leak is above or below that particular well. In other words, if the sump portion 58 of the observation well is free of product (fluid), the leak is downline from that well, whereas if the observation well sump 58 has product therein, the leak is above, i.e., upline or upstream, of that well. Thus, plural wells can be installed in order to more definitively isolate the location of a leak.

Referring to FIG. 14, a flexible corrugated pipe section 66 is shown which is used for containment of multi-directional swing joints and/or flex connectors. The left end, which is the upper end in use, of flexible pipe section 66 includes a neoprene rubber reducer fitting 68, and associated, different diameter steel clamps 70 and 72, for closing off the secondary containment pipe underneath the product (fuel) dispenser (not shown in FIG. 14). The lower end 74 of pipe section 66 is adapted to be attached to the outer secondary pipe 14 by means of fusion welding, as described above.

It should be noted that swing joints or flex connectors may not be required with the system of the present invention, although code requirements may dictate their use in any event. The purpose of such flex connectors and swing joints is to absorb the shock exerted on other pipe systems, and the double wall pipe system of the invention is, as described above, made of flexible (semi-rigid), high density polyethylene and a system incorporating such piping need not include such shock absorbing fittings.

Referring to FIG. 15, a test clamp assembly 76 is shown which enables testing of the integrity of the secondary pipe system. The test clamp assembly 76 include a high density polyethylene, rotationally molded bulkhead coupling member 78, a neoprene rubber reducer fitting 80 including an air-valve stem 82 incorporated therein, and a pair of stainless steel clamps 84 and 86. Clamp assembly 76 is used to seal off a collection sump wall at a location where a contained primary pipe 12 exists, as described below in connection with FIGS. 16 and 17. Once installed, the clamp assembly 76 permits the secondary pipe 14 connected thereto to be filled with air through valve stem 80 so as to permit performance of an air-pressure soap test to check the containment integrity of the secondary piping system. Installation of the testing clamp assembly 76 is described below in connection with FIGS. 16 and 17.

Turning to FIGS. 16 and 17, which show two stages in the installation of the overall system, as is evident from the foregoing, the present invention, in one important aspect thereof, can be generally described as a double wall piping system including an inner primary pipe 12 (FIGS. 1 and 2) for supplying product from a tank, a portion of which is indicated at 90 in FIGS. 16 and 17, to a dispenser, indicated at 92 in FIG. 17, and an outer secondary pipe 14 (FIGS. 1 and 2) which performs as an air tight guttering system, thereby providing containment of the primary pipe from under the dispenser 92 to the tank pump, indicated at 94 in FIGS. 16 and 17. Any leak in the system will flow from the high end of the system, under the product dispenser 92, to a collection sump 96, which contains tank pump 94, at the low end of the system. Detection of any such leakage can be accomplished at the sump end, using conventional alarm and signalling devices (not shown). It will be appreciated that the overall system typically includes more than one collection sumps (and may include more than one tank) but the description here will be limited to a single sump 96 and a single tank 90.

Referring to FIG. 16, which shows the primary pipe assembly stage of the double piping system, installation begins with mounting the collection sump 96 on the tank 90. Collection sump 96 serves to collect leaking product and to permit access for repairs or servicing of the associated tnak 90. As illustrated, sump 96 includes a lid 96a, an upper riser 96b and a sump housing 96c, although it will be appreciated that sumps of different designs and constructions can be used. Further, mounting of the collection sump 96 on tank 90 can be accomplished in a number of ways. For example, the collection sump 96 can be mounted directly onto a preinstalled saddle 90a, which is available on tanks fitted with a secondary containment system constructed in accordance with U.S. Pat. No. 4,672,366 (Butts) referred to above. Saddles such as indicated at 90a are specifically designed to accommodate the collection sump housing or body 96c, with a bottom rim of the collection sump body 96c fitting into a preformed retaining ring of the saddle 90a.

Figure 2:
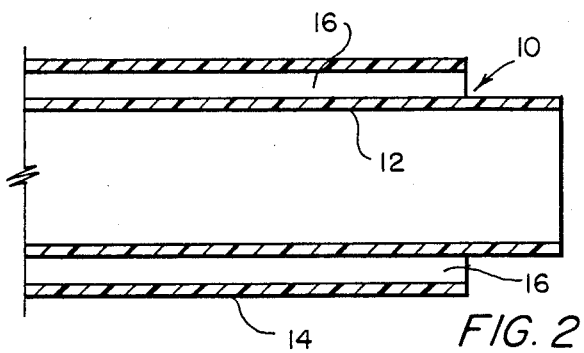
FIG. 2 is a transverse cross section taken generally along line 2—2 of FIG. 1.

After mounting the collection sump housing or body 96c on the tank 90, the pump 94 and an associated swing joint 98 and other miscellaneous components are mounted inside housing 96c. The swing joint piping 98 is connected to double wall pipe 10 by means of a connector fitting 28 corresponding to that described above and shown in FIG. 7. A test clamp assembly 76, corresponding to that described above and shown in FIG. 15, is installed over the connector fitting 28 inside the collecton sump 90. To do this, a pipe exit hole is cut in the wall of sump housing or body 96c and the bulkhead coupling 78 is installed into the hole to accommodate a first section of double wall pipe denoted 10a. The pipe section 10a is then cut to length and at each end, the secondary pipe 14 and spokes 16 (FIGS. 1 and 2) are cut back two inches as illustrated in FIG. 2 to expose the primary pipe 12. The double wall pipe section 10a is then inserted through the bulkhead coupling 78 into housing 96c and attached to connector fitting 28.

A second length of double wall pipe, denoted 10b, is cut to length and "stepped back" on each end as described above, and thereafter is attached to first pipe section 10a using a primary straight connector 24 corresponding to that described above in connection with FIG. 6.

In the illustrated embodiment, an observation well is employed which corresponds to that described above in connection with FIGS. 12 and 13, and, accordingly, a sump fitting 52 (also shown in FIG. 12) is slipped over the double wall pipe section 10b for attachment at a later stage.

At the first piping junction, the primary pipe 12 of the double wall pipe 10b is inserted into a primary fitting. In the illustrated example, this primary fitting is a "tee" fitting 22 (see also FIG. 5) but it will be understood that depending on the piping path, this could also be a 45° elbow fitting 18 (FIG. 3) or a 90° elbow fitting 20 (FIG. 4). In fact, in the embodiment shown in FIG. 16, a 90° elbow fitting 20 is used to connect a short length of piping 10c to a further length of piping 10d. The primary pipe 12 of the latter terminates in a further plastic pipe-to-metal pipe connector fitting 28' (see also FIG. 7), corresponding to that at the pump end of the system. Fitting 28' is preinstalled at the end of a swing joint 102 (or flex connector) adapted to be connected to dispenser 92 (FIG. 17).

After the entire primary piping system, including pipe 12 and the primary fittings described above, have been sealed by means of fusion wire welding as described previously, the primary line 12 is tested for air pressure integrity. This is preferably accomplished by capping off the riser pipe 102a located underneath the dispenser 92 (as well as any other such riser pipes located downstream).

Referring to FIG. 17, the double wall piping system of the invention is shown in this figure during the secondary pipe assembly stage. After all of the primary pipe has been sealed, tested and inspected, assembly and testing of the secondary containment system follows. Inside of the collection sump 96, the reducer test clamp assembly 76 is shifted onto and around the protruding bulkhead coupling 78, the large and small diameter clamps 84 and 86 are tightened to the pipe 10. On the outside of the wall of sumping housing 96c, the flange of the bulkhead coupling 78 is fusion rod welded to this wall. At the first junction, where a primary straight connector 24 (see FIG. 16) is installed, a secondary straight connector 48 (see also FIG. 11) is installed to seal together the straight runs of the secondary pipes 14 of the double wall pipe sections 10a and 10b.

The secondary sump fitting 52 is then installed as described above in connection with FIGS. 12 and 13. In brief review, with a sump fitting 52 shifted aside, a hole (approximately 3 inches in diameter) is drilled into the secondary pipe 14 of double wall pipe section 10b. Thereafter, the fitting 52 is moved to a position over the hole with the sump portion 58 pointing downwardly and the sump fitting 52 is then sealed to in place. A riser pipe 62 (see also FIG. 13) is installed into top portion 60 and the top of the observation well thus formed is sealed with a cap 64 to permit future access.

Further down the line from pump 94, all pipe junctions are fitted with the proper secondary fittings. In the illustrated embodiment, these fittings comprise a tee fitting 46 (see also FIG. 10) and a 90° elbow 44 (see also FIG. 9). A corrugated flexible pipe 66 (see also FIG. 14) is installed at the end of the line down over the riser pipe 102a and around the swing pipe 102 and is attached to the secondary pipe 14 of pipe section 10d. At the upper end of the flexible corrugated pipe 66 a terminating clamp 70 (see also FIG. 14) is attached which is affixed to the riser pipe 102a just under the location of a shear valve (not shown) which is installed later.

Once all of the pipes and fittings are in position, the secondary pipe 14 is sealed to the secondary fittings described above by means of fusion wire welding, as described previously. After the entire secondary piping system has been sealed, an air pressure test of the type described previously in connection with FIG. 15 may be performed on the secondary system by inflating the air test clamp assembly 76 inside of the sump housing 96c to an air pressure level no higher than 5 psi. A conventional outside soap test can be used to determine if there are any pinhole leaks at any of the secondary joints. Once the secondary containment pipe has been tested and inspected, the reducer section 84 of air test clamp assembly 76 should be loosened and slid back away from the bulkhead coupling 78.

As discussed above, fusion wire welding is used to make various connections in the system. Considering this process in more detail, the process uses a wire ribbon (denoted 26 in FIG. 3 to 6) which, in an exemplary embodiment is ½ inch in width and 50 mils in thickness and is made up of 28 guage resistive wire with a resistance of 0.75 ohms per linear foot. Four parallel strands of such ribbon or wire are coated with or otherwise incorporated in the polyethylene of the double wall pipe 10 and the primary and secondary fittings described above. The length of the wire ribbon is approximately thirty-six inches with the wire ends connected so as to create a single wire circuit with two four-inch connector wires located on the same end.

The profile of the wire ribbon is designed with a female and male interlock snap (not shown) on opposite sides. This allows the wire ribbon to form a set coil when wrapped around the telescoping pipe. As the wire ribbon is being wrapped, the male (barbed) edge snaps itself as it meets the female edge. This design allows a tight and stable coil to be formed around the pipe 10 which can then be shifted down the pipe into and between the overlapped joint of the double-wall pipe and the secondary fittings.

Once the wire ribbon is inserted into the overlapped joint, a steel clamp (not shown) is installed around the secondary fitting directly over the coiled wire ribbon inside the overlapped joint. Pressure is then applied to the overlapped joint by tightening the aforementioned steel clamp. The two conductor lead wires (denoted 26a, 26b in FIGS. 3 to 6) are then attached to a terminal block clamp (not shown) which snaps onto the pipe to prevent the wire leads from movement during the fusion welding process. The terminal block clamp is connected to a fusion power unit (not shown) by a long (six foot) cord. By pressing a start button (not shown) on the fusion power unit, current from a 24 volt supply is delivered to the fusion welding ribbon. The resistance thereof causes the wires to get hot and create sufficient heat to produce a fusion bond between both the double-wall pipe and the corresponding secondary fitting. The fusion power unit is designed so that the unit will deliver current for a set amount of time and then automatically cut off.

This same fusion welding procedure can be duplicated at all overlapped joints where the double-wall pipe meets a secondary tee 46 (FIG. 10), a secondary 90° elbow 44 (FIG. 9), a secondary 45° elbow 42 (FIG. 8), a secondary corrugated flexible pipe 66 (FIG. 14), a bulkhead coupling 78 (FIG. 15), a close-off coupling (not shown) or a cross shaped monitor fitting 52 of an observation well assembly (FIGS. 12 and 13).

The fusion rod welding process described above involves the use of a hot air gun (not shown) which specially equipped with a nozzle tip having a shaft designed to accomodate a V-profiled plastic rod. This plastic rod is inserted into the shaft where the rod is heated and applied to the surface of a joint to be welded. The hot air gun pre-heats the joint as the semi-melted rod is being laid so as to produce a strong homogeneous weld. This fusion rod welding process is performed on the top groove 50 of all split fittings, around the flange of all bulkhead fittings (e.g. fitting 78) and close-off couplings (not shown) and around the flanges of all riser mount collars.

Both fusion wire welding and fusion rod welding are disclosed in somewhat more detail in my concurrently filed, copending Application Serial No. 07/103,206, now U.S. Pat. No. 4,805,444, entitled "Secondary Containment System", the subject matter of which is hereby incorporated by reference. Further, it will be understood that other plastic welding techniques can be used including the use of "self welding" plastics which can be welded by the application of heat thereto.

Although the invention has been described relative to preferred embodiments thereof, it will be understood by those skilled in this art that variations and modifications in these exemplary embodiments can be effected without departing from the scope and spirit of the invention.

I claim:

1. In a pumping system for fluid products, such as gasoline, diesel fuel and chemicals, and including a pump for pumping such products from a storage tank through a pipeline connection to a product dispenser, the improvement wherein said pipeline connection comprises a double wall piping system comprising an inner primary pipe, an outer secondary pipe spaced from and surrounding said primary pipe, means for supporting the secondary pipe in spaced relation to the primary pipe so as to create an annular space therebetween, and an air test clamp assembly clamped to said double wall piping system for enabling air pressure testing of a secondary piping system incorporating said secondary pipe, said air test clamp assembly being disposed at a location at which the primary pipe extends beyond the secondary pipe and said air test clamp assembly comprising a fitting member, clamping means for releasably clamping one end of the fitting member to the exterior of the primary pipe and for clamping the other end of the fitting member externally of the secondary pipe, and valve means in said fitting member for permitting connection of the fitting member to a source of air under pressure so that air under pressure can be supplied to the secondary piping system, said air test clamp assembly being affixed to a wall of a unit of the pumping system, said wall having a hole therein through which a portion of said pipeline system extends, and said test clamp assembly further comprising a coupling member including a flange affixed to said wall and a base portion extending through said wall, and said clamping means comprising a coupling member including a flange affixed to said wall and a base portion extending through said wall, and said clamping means comprising a first clamp for clamping said one end of said fitting member to the exterior of said primary pipe and a second clamp for clamping said other end of said fitting to the exterior of the base portion of said coupling member.

2. A pumping system as claimed in claim 1 wherein said fitting member is fabricated of a resilient material and comprises first and second spaced end portions of different diameters and an intermediate portion in which said valve means is disposed.

3. In a pumping system for fluid products, such as gasoline, diesel fuel and chemicals, and including a pump for pumping such products from a storage tank through a pipeline connection to a product dispenser, the improvement wherein said pipeline connection comprises a double wall piping system comprising an inner primary pipe, an outer secondary pipe spaced from and surrounding said primary pipe, means for supporting the secondary pipe in spaced relation to the primary pipe so as to create an annular space therebetween, and at least one secondary fitting for connecting adjacent portions of the secondary pipe of the pipeline system, said secondary fitting comprising a split fitting member having a single split therein extending the length in the top surface thereof so as to permit the ends of the fitting which define the split to be forced apart and thus permit a portion of the primary pipe to be received therein, the ends of the secondary fitting which define said split being shaped to define a V-groove therebetween, and a fusion rod weld located in said V-groove joining said ends of said secondary fitting together.

4. A pumping system as claimed in claim 3 wherein said spacing means comprises a plurality of integral spoke members extending radially between said primary and secondary pipes and formed as a single extruded unit therewith.

5. A pumping system as claimed in claim 3 wherein at least one end of the secondary pipe terminates short of the corresponding end of the primary pipe so as to permit testing and inspection of the primary pipe prior to completion of a secondary piping system in which the secondary pipe is incorporated.

6. A pumping system as claimed in claim 3 wherein said system further comprises at least one primary pipe fitting for said primary pipe, said primary pipe fitting including a built-in fusion welding wire for bonding the fitting to the primary pipe.

7. A pumping system as claimed in claim 3 wherein said pumping system includes at least one flexing connection and said pipeline system comprises a corrugated flexible pipe in which said flexing connection is contained and clamping means for clamping said flexible pipe in place.

8. A pumping system as claimed in claim 7 wherein said flexing connection comprises a swing joint.

9. A pumping system as claimed in claim 3 wherein said pumping system includes a metal primary line and said double wall piping system includes a connector member for connecting the primary pipe to said metal primary line, said connector member comprising a metal member having connection end adapted to be connected to the metal primary line and a base portion which is serrated or barbed in cross section, and an injection molded, high density plastic end section encapsulating said base portion of said metal member.

10. An underground piping system comprising primary and secondary pipes, and air test means for enabling air pressure testing of the secondary pipe, said air test means comprising an air test clamp assembly disposed at a location where the primary pipe extends beyond the secondary pipe and comprising a fitting member, clamping means for releasably clamping one end of the fitting member externally of the secondary pipe, and valve means for permitting connection of the fitting member to a source of air under pressure so that air under pressure can be supplied to a secondary piping system incorporating said second pipe, said air test clamp assembly being affixed to a wall of a unit in the piping system, said wall having a hole therein through which a portion of said pipeline system extends and said test clamp assembly further comprising a coupling member including a flange affixed to said wall and a base portion extending through the hole in said wall, said clamping means comprising a first clamp for clamping said one end of said fitting member to the exterior of said primary pipe and a second clamp for clamping said other end of said fitting to the exterior of the base portion of said coupling member.

* * * * *